United States Patent [19]

Brown, deceased et al.

[11] 3,891,424

[45] June 24, 1975

[54] HERBICIDAL 1-CARBONAMIDOTHIO-3-ARYL UREAS

[75] Inventors: Melancthon S. Brown, deceased, late of Berkeley, Calif.; by Gustave K. Kohn, special administrator, Berkeley, Calif.

[73] Assignee: Chevron Research Company, San Francisco, Calif.

[22] Filed: Dec. 17, 1973

[21] Appl. No.: 425,672

Related U.S. Application Data

[63] Continuation-in-part of Ser. No. 88,229, Nov. 9, 1970, Pat. No. 3,824,281.

[52] U.S. Cl. .................. 71/98; 71/67; 424/244; 424/267; 424/274; 424/322
[51] Int. Cl. ................................................ A01n 9/12
[58] Field of Search .................................. 71/67, 98

[56] References Cited
UNITED STATES PATENTS

| | | | |
|---|---|---|---|
| 3,276,855 | 10/1966 | Richter | 71/98 |
| 3,755,437 | 8/1973 | Brown | 71/98 |
| 3,812,209 | 5/1974 | Brown | 71/98 |

Primary Examiner—James O. Thomas, Jr.
Attorney, Agent, or Firm—G. F. Magdeburger; Dix A. Newell; Raymond Owyang

[57] ABSTRACT

Compounds of the formula

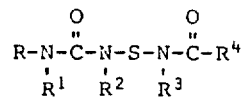

wherein R is phenyl substituted with 0 to 4 halogens, trihalomethyl, nitro groups, lower alkyl or lower alkoxy groups; $R^1$ and $R^2$ are hydrogen or lower alkyl; $R^3$ is alkyl of 1 to 10 carbon atoms optionally substituted with halogen atoms or cycloalkyl of 3 to 10 carbon atoms optionally substituted with halogen atoms; $R^4$ is hydrogen, alkyl of 1 to 10 carbon atoms optionally substituted with halogen atoms, cycloalkyl of 3 to 10 carbon atoms optionally substituted with halogen atoms, with the proviso that $R^3$ and $R^4$ may be joined to form a linear alkylene radical of 3 to 5 carbon atoms which is bound to the carbonyl and nitrogen to form a ring. The compounds are herbicidal.

18 Claims, No Drawings

HERBICIDAL 1-CARBONAMIDOTHIO-3-ARYL UREAS

RELATED APPLICATION

This application is a continuation-in-part of application Ser. No. 88,229, filed Nov. 9, 1970 now U.S. Pat. No. 3,824,281, the disclosure of which is hereby incorporated by reference.

FIELD OF THE INVENTION

This invention is directed to novel ureas and their use as herbicides. More particularly, it concerns 1-(N-alkylcarboxamidothio)-3-phenyl ureas and their use as herbicides.

DESCRIPTION OF THE INVENTION

The ureas of this invention may be represented by the formula

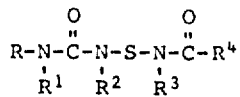

wherein R is phenyl or phenyl substituted with 1 to 4 halogen atoms of atomic number 9 to 35 (fluorine, chlorine or bromine), trifluoromethyl, trichloromethyl, nitro groups, alkyl groups individually of 1 to 4 carbon atoms or alkoxy groups individually of 1 to 4 carbon atoms; $R^1$ is hydrogen or alkyl of 1 to 4 carbon atoms; $R^2$ is hydrogen or alkyl of 1 to 4 carbon atoms; $R^3$ is alkyl of 1 to 10 carbon atoms, alkyl of 1 to 10 carbon atoms substituted with 1 to 4 halogen atoms of atomic number 17 to 35 (chlorine or bromine), cycloalkyl of 3 to 10 carbon atoms or cycloalkyl of 3 to 10 carbon atoms substituted with 1 to 4 halogen atoms of atomic number 17 to 35; $R^4$ is hydrogen, alkyl of 1 to 10 carbon atoms, alkyl of 1 to 10 carbon atoms substituted with 1 to 4 halogen atoms of atomic number 17 to 35, cycloalkyl of 3 to 10 carbon atoms or cycloalkyl of 3 to 10 carbon atoms substituted with 1 to 4 halogen atoms of atomic number 17 to 35, with the proviso that $R^3$ and $R^4$ may be joined to form a linear alkylene radical of 3 to 5 carbon atoms which is bound to the carbonyl and nitrogen to form a ring.

Preferably R is phenyl or phenyl substituted with 1 to 4 halogen atoms of atomic number 9 to 35 or nitro groups, more preferably 1 to 2 halogen atoms of atomic number 9 to 35 or trifluoromethyl or nitro groups. When R is phenyl substituted with alkyl or alkoxy, it is preferred that the alkyl or alkoxy substituents be in position 2, 4 or 6 of the benzene nucleus.

$R^1$ is preferably hydrogen or alkyl of 1 to 2 carbon atoms, more preferably methyl. $R^2$ is preferably alkyl of 1 to 2 carbon atoms.

$R^3$ is preferably alkyl of 1 to 6 carbon atoms, alkyl of 1 to 6 carbon atoms substituted with 1 to 4 halogen atoms of atomic number 17 to 35, preferably 1 to 2 halogen atoms of atomic number 17 to 35, cycloalkyl of 3 to 6 carbon atoms or cycloalkyl of 3 to 6 carbon atoms substituted with 1 to 4 halogen atoms of atomic number 17 to 35, preferably 1 to 2 halogen atoms of atomic number 17 to 35. Still more preferably, $R^3$ is alkyl of 1 to 4 carbon atoms substituted with 0 to 2 halogen atoms of atomic number 17 to 35, preferably chlorine.

$R^4$ is preferably hydrogen, alkyl of 1 to 6 carbon atoms, alkyl of 1 to 6 carbon atoms substituted with 1 to 4 halogen atoms of atomic number 17 to 35, preferably 1 to 2 halogen atoms of atomic number 17 to 35, cycloalkyl of 3 to 6 carbon atoms or cycloalkyl of 3 to 6 carbon atoms substituted with 1 to 4 halogen atoms of atomic number 17 to 35, preferably 1 to 2 halogen atoms of atomic number 17 to 35. More preferably, $R^4$ is hydrogen or alkyl of 1 to 4 carbon atoms, still more preferably 1 to 3 carbon atoms, substituted with 0 to 2 halogen atoms of atomic number 17 to 35, preferably chlorine, or cycloalkyl of 3 to 6 carbon atoms, preferably cyclohexyl, substituted with 0 to 2 halogen atoms of atomic number 17 to 35.

$R^3$ and $R^4$ may be joined to form a linear alkylene radical of 3 to 5 carbon atoms which is bound to the carbonyl and nitrogen to form a ring. Preferably the linear alkylene radical will contain 3 carbon atoms.

Representative groups which R may represent include phenyl, o-fluorophenyl, p-fluorophenyl, m-chlorophenyl, o-fluoro-p-bromophenyl, o-methylphenyl, p-ethylphenyl, p-methoxyphenyl, m-butoxyphenyl, p-nitrophenyl, o-nitro-p-methoxyphenyl.

Representative alkyl groups which $R^1$ and $R^2$ may represent include methyl, ethyl, n-propyl, isopropyl, n-butyl and isobutyl.

Representative groups which $R^3$ and $R^4$ may represent include methyl, ethyl, n-propyl, isopropyl, n-butyl, isobutyl, pentyl, hexyl, heptyl, octyl, nonyl, decyl, 2-methylbutyl, 3-methylpentyl, cyclopentyl, cyclohexyl, cyclooctyl, chloromethyl, 2-chloroethyl, 3-chloropropyl, 4-chloroamyl, 6-chlorohexyl, 2,6-dichlorocyclohexyl, 2,6-dibromocyclohexyl, 3-bromocyclohexyl, bromoethyl, 2-bromoethyl, 3-bromopropyl, etc.

Alkyl radicals which $R^3$ and $R^4$ taken together may represent are propylene, butylene and amylene.

Typical ureas of the present invention include:
1-methyl-1-(N-methylformamidothio)-3-o-fluorophenyl urea,
1-(N-methylforamidothio)-3-o-trifluorophenyl urea,
1-methyl-1-(N-methylacetamidothio)-3-o-chlorophenyl urea,
1-methyl-1-(N-methylacetamidothio)-3-trifluoromethylphenyl urea,
1-methyl-1-(N-methylpropionamidothio)-3-p-chlorophenyl urea,
1-methyl-1-(N-methylpropionamidothio)-trichloroethylphenyl urea,
1-methyl-1-(N-methylbutyramidothio)-3-m-bromophenyl urea,
1-methyl-1-(N-methyl-valeramidothio)-3-o-methylphenyl urea,
1-methyl-1-(N-methylcyclohexylcarboxamidothio)-3-o-methoxyphenyl urea,
1-methyl-1-(N-ethyl-3,4,5-trichlorovaleramidothio)-3-p-propylphenyl urea,
1-ethyl-1-(N-methylformamidothio)-3-o-fluoro-p-bromophenyl urea,
1-methyl-1-(N-methylcyclohexylcarboxamidothio)-3-(2-trifluoromethylphenyl) urea,
1-butyl-1-(N-ethylformamidothio)-3-p-ethoxyphenyl urea, 1-methyl-1-(N-propylacetamidothio)-3-m-nitro-p-bromophenyl urea,
1-methyl-1-(N-methylcaproamidothio)-3-o-fluorophenyl urea,
1-methyl-1-(N-methyl-2-chlorocyclopentylcarboxamidothio)-3-phenyl urea,
1-ethyl-1-(N-cyclohexylformamidothio)-3-m-chlorophenyl urea,
1-methyl-1-(N-chloromethylacetamidothio)-3-(2-chloro-5-fluorophenyl) urea.

The ureas of the present invention may be prepared by reacting a urea with an acylamido sulfenyl chloride according to the following equation:

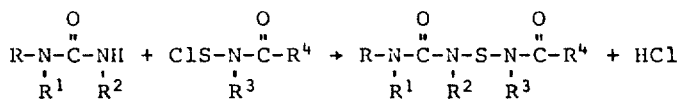

wherein R, R$^1$, R$^2$, R$^3$, and R$^4$ are as previously defined. This reaction may be carried out in pyridine, dimethylformamide with or without an acid acceptor or in other solvents such as methylene chloride, chloroform, acetonitrile and dimethoxyethane using an acid acceptor. Acid acceptors which may be used with dimethyl formamide and these other solvents are pyridine, alkylpyridines, quinoline and similar heterocyclic bases. Pyridine is a preferred acid acceptor. When pyridine is used alone it acts both as a solvent and acid acceptor. The preferred medium for carrying out this reaction is methylene chloride with pyridine as an acid acceptor.

The pressures and temperatures at which the reaction is carried out are not critical. Thus temperatures ranging from ambient to about 60°C. will normally be used. However, lower temperatures or higher temperatures, up to the decomposition temperature of the reactants and product may be used. The pressure will generally be atmospheric or autogenous. The reaction will normally be complete within 30 minutes to 4 hours.

The urea reactant in the above equation may be prepared in situ or beforehand. Conventional methods such as reacting an amine with an isocyanate may be used to prepare this reactant.

The acylamido sulfenyl chloride reactant may be prepared by reacting sulfur dichloride with a monoalkylated amide or lactam. This reaction is illustrated by the following equation:

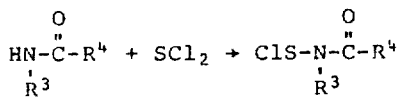

wherein R$^3$ and R$^4$ are as previously defined. It is desirable to use stoichiometric proportions of the reactants or an excess of sulfur dichloride reactant up to about 4:1 mol ratio.

The reaction temperature in general is not critical, and will usually be in the range of −50° to 100°C., preferably −20° to 60°C. Likewise the pressure is not critical, and will usually be atmospheric or autogenous. Reaction time will generally be from ¼ hour to 5 hours.

The reaction will generally be carried out in the presence of an inert solvent such as dichloromethane, diethylether, tetrahydrofuran, dimethylformamide, dioxane, acetonitrile, and the like. Generally each of the reactants will be admixed separately with a solvent and then the mixture containing the amide and preferably a hydrogen halide acceptor will be added slowly with stirring to the mixture containing the sulfur dichloride.

The amount of solvent should be equal to or up to five times the weight of the sulfur dichloride. Likewise, the solvent for the amide-halide acceptor mixture should be equal to or up to five times the weight of both.

The sulfur dichloride should be added in high purity, for example greater than 98 percent purity. It is frequently desirable to have a small amount of an inhibitor such as tributyl phosphate or triethylphosphate present with the sulfur dichloride in order to maintain the high purity.

The reaction is preferably carried out in the presence of a mild hydrogen halide acceptor. At least stoichiometric amounts of acceptor should be used. Soluble tertiary amines such as pyridine and trialkylamines, e.g., triethylamine and tributylamine, are preferred.

The acylamido sulfenyl chloride can generally be recovered from the reaction mixture by stripping any excess sulfur dichloride, filtering off the salt formed between the hydrogen halide acceptor and the HCl, evaporating the solvent and the product purified as by distillation or recrystallization.

EXAMPLES

The following examples illustrate methods used to prepare the ureas of the present invention. These examples are in no way intended to limit the invention described herein. Unless otherwise indicated, percentages are by weight.

EXAMPLE 1

1-methyl-1-(N-methylformamidothio)-3-2-fluorophenyl) urea 12.5 g. of N-methylformamido sulfenyl chloride in 20 ml. of methylene chloride was added slowly to a slurry of 16 g. of 1-methyl-3-(2-fluorophenyl) urea and 9 ml. of pyridine in 150 ml. of methylene chloride with a slight exothermicity. The reaction mixture was stirred one hour at room temperature, washed with water, then with aqueous sodium bicarbonate, and again with water. After being dried over magnesium sulfate, the product solution was stripped of solvent under vacuum and the residual oil was chromatographed on a column of silica gel eluting with ether. A portion of the chromatographed product was recrystallized from benzenehexane. The product melted at 65°-69°C., and had the following elemental analysis: %S, calc. 12.45, found 12.92; percent F, calc. 7.40, found 7.64.

EXAMPLE 2

1-methyl-1-(N-methylformamidothio)-3-(3,4-dichlorophenyl) urea 14 g. of N-methylformamido sulfenyl chloride diluted with 10 ml. of methylene chloride was added slowly from a dropping funnel to 20 g. of 1-methyl-3-(3,4-dichlorophenyl) urea and 10 ml. of pyridine in 200 ml. methylene chloride in a 500 ml. three-necked flask equipped with mechanical stirrer. After addition was complete, the reaction mixture was stirred for 2 hours at room temperature, diluted with 200 ml. methylene chloride, washed with 200 ml. of water, then with 200 ml. aqueous sodium bicarbonate solution and again with 200 ml. of water. After drying and solvent removal under vacuum, the crude product was chromatographed on a column of silica gel eluting with ether. The product was further purified by recrystallization from ethanol. The recrystallized product melted at 99°-103°C. and had the following elemental analysis: %S, calc. 10.40, found 10.30; percent Cl, calc. 23.01, found 22.95.

Other ureas included within this invention were prepared using the methods as described above. These compounds are listed in Table I.

UTILITY

The ureas of the present invention are, in general, herbicidal in both pre- and post-emergent applications. For pre-emergent control of undesirable vegetation, these ureas will be applied in herbicidal quantities to the environment, e.g., soil infested with seeds and/or seedlings of such vegetation. Such application will inhibit the growth of or kill the seeds, germinating seeds and seedlings. For post-emergent applications, the ureas of the present invention will be applied directly to the foliage and other plant parts. Generally they are effective against weed grasses as well as broadleaved weeds. Some may be selective with respect to type of application and/or type of weed.

Pre- and post-emergent herbicidal tests on representative ureas of this invention were made using the following methods:

Pre-emergent Test

An acetone solution of the test ureas was prepared by mixing 750 mg. urea, 220 mg. of a nonionic surfactant and 25 ml. of acetone. This solution was added to approximately 125 ml. of water containing 156 mg. of surfactant.

Seeds of the test vegetation were planted in a pot of soil and the urea solution was sprayed uniformly onto the soil surface at a dose of 100 migrograms per cm$^2$. The pot was watered and placed in a greenhouse. The pot was watered intermittently and was observed for seedling emergence, health of emerging seedlings, etc., for a 3-week period. At the end of this period, the herbicidal effectiveness of the urea was rated based on the physiological observations. A 0-to-100 scale was used; 0 representing no phytotoxicity, 100 representing complete kill.

Post-emergent Test

The test urea was formulated in the same manner as described above for the pre-emergent test. The concentration of the urea in this formulation was 5000 ppm. This formulation was uniformly sprayed on 2 similar pots of 24-day-old plants (approximately 15 to 25 plants per pot) at a dose of 100 micrograms per cm$^2$.

After the plants had dried, they were placed in a greenhouse and then watered intermittently at their bases as needed. The plants were observed periodically for phytotoxic effects and physiological and morphological responses to the treatment. After 3 weeks the herbicidal effectiveness of the urea was rated, based on these observations. A 0-to-100 scale was used; 0 representing no phytotoxicity, 100 representing complete kill.

The results of these tests appear in Table II.

The amount of urea administered will vary with the particular plant part or plant growth medium which is to be contacted, the general location of application, i.e., sheltered areas such as greenhouses as compared to exposed areas such as fields, as well as the desired type of control. For pre-emergent control of most plants, dosages in the range of about 0.5 to 20 lbs. per acre will be used. Such administration will give a concentration of about 2 to 80 ppm. urea distributed throughout 0.1 acre-foot. For post-emergent application, such as foliar spray application, compositions containing about 0.5 to 8 lbs. urea per 100 gal. spray will be used. Such application is equivalent to about 0.5 to 20 lbs. urea per acre.

The herbicidal compositions of this invention comprise an herbicidal amount of one or more of the above-described ureas intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth medium or plant tissue and generally enhance their effectiveness. These compositions may also contain other pesticides, stabilizers, conditioners, fillers and the like.

Some of the compounds of the present invention also exhibit algicidal activity. The test procedure is as follows:

An acetone solution of equal parts of urea and a surfactant was prepared. This solution was mixed with a nutrient broth in a quantity sufficient to give a concentration of 2 ppm. urea. Four identical 150 ml. specimen cups were filled with this mixture. 350–400 mg. of Euglena was added to each specimen cup and the cups were then placed in an environment chamber for incubation. The cups were observed periodically for alga growth. The algicidal effectiveness of the urea was determined based on a final observation of alga growth after 10 days.

The results of these tests, reported as the average of the 4 specimen cups on a 0-to-100 basis — 0 indicating no effectiveness; 100 indicating complete effectiveness — are reported in Table III.

TABLE I

| Compound | Elemental analysis | | | | Melting Point, °C. |
|---|---|---|---|---|---|
| | S Calc. | Found | Halogen Calc. | Found | |
| 1-methyl-1-(N-methylformamidothio)-3-(2-chlorophenyl) urea | 11.70 | 12.55 | 12.98 | 13.48 | oil |
| 1-methyl-1-(N-methylformamidothio)-3-(4-nitrophenyl) urea | 11.25 | 10.95 | 19.70* | 19.05* | 115–118 |
| 1-ethyl-1-(N-methylformamidothio)-3-(3,4-dichlorophenyl) urea | 9.83 | 10.40 | 22.1 | 22.70 | 68–72 |
| 1-methyl-1-(N-methylformamidothio)-3-(3-chloro-4-bromophenyl) urea | 9.07 | 9.35 | 5.66 | 5.46 | 98–101 |
| 1,3-dimethyl-1-(N-methylformamidothio)-3-phenyl urea | 12.7 | 12.90 | 16.6* | 15.95* | oil |
| 1-methyl-1-(N-methylacetamidothio)-3-(3,4-dichlorophenyl) urea | 9.97 | 9.68 | 21.75 | 21.70 | 111–113 |
| 1-methyl-1-(N-methylacetamidothio)-3-(2-fluorophenyl) urea | 11.85 | 11.59 | 7.01 | 7.23 | 94–97 |
| 1-methyl-1-(N-methylacetamidothio)-3-(4-chlorophenyl) urea | 11.15 | 10.95 | 12.33 | 12.18 | 92–97 |
| 1-methyl-1-(N-methylacetamidothio)-3-(4-nitrophenyl) urea | 10.77 | 10.40 | 18.8* | 18.1* | 119–125 |
| 1-methyl-1-(N-ethylformamidothio)-3-(2-fluorophenyl) urea | 11.84 | 11.88 | 15.5* | 15.13* | 79–82 |
| 1-methyl-1-(N-ethylformamidothio)-3-(4-nitrophenyl) urea | 10.77 | 10.51 | 18.8* | 18.3* | 105–110 |

TABLE I—Continued

| Compound | Elemental analysis S Calc. | Found | Halogen Calc. | Found | Melting Point, °C. |
|---|---|---|---|---|---|
| 1-methyl-1-(N-methylbutyramidothio)-3-(2-fluorophenyl) urea | 10.72 | 10.95 | — | — | oil |
| 1-methyl-1-(N-methylbutyramidothio)-3-(4-nitrophenyl) urea | 9.84 | 9.77 | 17.2* | 17.08* | 119–121 |
| 1-methyl-1-(N-methylcyclohexylcarboxamidothio)-3-(2-fluorophenyl) urea | 9.46 | 9.40 | 5.6 | 5.50 | oil |
| 1-methyl-1-(N-methylcyclohexylcarboxamidothio)-3-(4-nitrophenyl) urea | 8.77 | 8.70 | 15.3* | 15.65* | 127–135 |
| 1-methyl-1-(N-methylbutyramidothio)-3-(3-nitrophenyl) urea | 9.82 | 9.86 | 17.18* | 16.40* | oil |
| 1-methyl-1-(N-methylpropylamidothio)-3-(2-fluorophenyl) urea | 11.24 | 11.38 | — | — | oil |
| 1-(N-methylformamidothio)-3-phenyl urea | 14.21 | 14.40 | 18.68* | 18.10* | 140–143 |

*nitrogen

TABLE II

| Compound | Herbicidal Effectiveness -- Pre/Post O | W | C | M | P | L |
|---|---|---|---|---|---|---|
| 1-methyl-1-(N-methylformamidothio)-3-(2-fluorophenyl) urea | 98/100 | 100/100 | 100/100 | 100/100 | 100/100 | 100/100 |
| 1-methyl-1-(N-methylformamidothio)-3-(2-chlorophenyl urea | 100/100 | 93/100 | 90/100 | 100/100 | 100/100 | 100/100 |
| 1-methyl-1-(N-methylformamidothio)-3-(3,4-dichlorophenyl) urea | 96/100 | 100/100 | 100/100 | 100/100 | 100/100 | 100/100 |
| 1-methyl-1-(N-methylformamidothio)-3-(4-nitrophenyl) urea | — | — | — | 75/70 | 80/70 | 100/80 |
| 1-ethyl-1-(N-methylformamidothio)-3-(3,4-dichlorophenyl) urea | 70/100 | 75/100 | 90/100 | 95/100 | 100/100 | 100/100 |
| 1-methyl-1-(N-methylformamidothio)-3-(3-chloro-4-bromophenyl) urea | 80/100 | 100/100 | 100/100 | 100/100 | 100/100 | 100/100 |
| 1,3-dimethyl-1-(N-methylformamidothio)-3-phenyl urea | 95/— | — | 90/— | 100/90 | 100/90 | 95/95 |
| 1-methyl-1-(N-methylacetamidothio)-3-(3,4-dichlorophenyl urea | —/100 | 100/100 | 100/100 | 100/100 | 100/100 | 100/100 |
| 1-methyl-1-(N-methylacetamidothio)-3-(2-fluorophenyl) urea | 98/100 | 100/100 | 100/100 | 100/100 | 100/100 | 100/100 |
| 1-methyl-1-(n-methylacetamidothio)-3-(4-chlorophenyl) urea | 93/100 | 100/100 | 100/85 | 100/100 | 100/100 | 100/100 |
| 1-methyl-1-(N-methylacetamidothio)-3-(4-nitrophenyl) urea | — | — | — | 90/— | 75/— | 90/— |
| 1-methyl-1-(N-ethylformamidothio)-3-(2-fluorophenyl) urea | 100/100 | 100/100 | 100/100 | 100/100 | 100/100 | 100/100 |
| 1-methyl-1-(N-ethylformamidothio)-3-(4-nitrophenyl) urea | — | — | — | 95/90 | 95/— | 95/— |
| 1-methyl-1-(N-methylbutyramidothio)-3-(2-fluorophenyl) urea | 100/100 | 100/100 | 100/100 | 100/100 | 100/100 | 100/100 |
| 1-methyl-1-(N-methylbutyramidothio)-3-(4-nitrophenyl) urea | 95/— | — | 90/— | 70/— | — | — |
| 1-methyl-1-(N-methylcyclohexylcarboxamidothio)-3-(2-fluorophenyl) urea | 100/100 | 100/100 | 100/100 | 100/100 | 100/100 | 100/100 |
| 1-methyl-1-(N-methylbutyramidothio)-3-(3-nitrophenyl) urea | 70/— | —/88 | 75/— | 97/80 | 83/— | 93/— |
| 1-methyl-1-(N-methylpropylamidothio)-3-(2-fluorophenyl) urea | 100/100 | 100/100 | 100/100 | 100/100 | 100/100 | 100/100 |
| 1-(N-methylformamidothio)-3-phenyl urea | — | — | — | 66/— | 85/— | 70/— |

O = Wild Oats (avenua fatua)   M = Mustard (Brassica arvensis)
W = Watergrass (Echinochloa crusgalli)
P = Pigweed (Amaranthus retroflexus)
C = Crabgrass (Digitaria sanguinalis)
L = Lambsquarter (Chenopodium album)

TABLE III

| Compound | Euglena, % control |
|---|---|
| 1-methyl-1-(N-methylformamidothio)-3-(2-fluorophenyl) urea | 100 |
| 1-methyl-1-(N-methylformamidothio)-3-(3,4-dichlorophenyl) urea | 100 |
| 1-ethyl-1-(N-methylformamidothio)-3-(3,4-dichlorophenyl) urea | 100 |
| 1-methyl-1-(N-methylformamidothio)-3-(3-chloro-4-bromophenyl) urea | 100 |
| 1-methyl-1-(N-methylacetamidothio)-3-(3,4-dichlorophenyl) urea | 100 |
| 1-methyl-1-(N-methylcyclohexylcarboxamidothio)-3-(2-fluorophenyl) urea | 100 |

Ureas of this invention when used for controlling microbiological organisms such as algae can be applied to such organisms in aqueous bodies such as lakes, streams, canals, pools and the like. Generally a biocidal quantity of one or more of the ureas of this invention is added to the aqueous growth environment of the organisms. Usually this dosage will range from 0.1 to 500 ppm. In any given instance, the optimum dosage will depend upon the particular organism and aqueous body involved. Preferably the amount employed will range from 0.1 to 10 ppm. In terms of pounds of urea per acre of water one foot deep, 0.1 to 10 ppm is equal to about 0.3 to 30 lbs. per acre of water one foot deep. The ureas may be applied as dispersible powders or in solutions with water-miscible solvents. Preferred ureas for control of algae have halogen-substituted phenyl groups (R in the formula of the compound).

Some of the ureas of this invention were also used to control fungi such as Monolinia fructicola, Alternaria solani, etc. When used as fungicides the ureas will be formulated and applied in fungicidal amounts by conventional art methods to fungi or hosts which are subject to fungus attack, especially vegetative hosts such as plants, plant seeds, paper and the like. They may be combined with inert liquids and solid carriers as powders, solutions or dispersions for such use.

What is claimed is:

1. A method for controlling the growth of undesirable vegetation which comprises applying an herbicidally effective amount of a urea of the formula

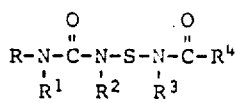

wherein R is phenyl or phenyl substituted with 1 to 4 halogen atoms of atomic number 9 to 35 (fluorine, chlorine or bromine), trifluoromethyl, trichloromethyl, nitro groups, alkyl groups individually of 1 to 4 carbon atoms or alkoxy groups individually of 1 to 4 carbon atoms; $R^1$ is hydrogen or alkyl of 1 to 4 carbon atoms; $R^2$ is hydrogen or alkyl of 1 to 4 carbon atoms; $R^3$ is alkyl of 1 to 10 carbon atoms, alkyl of 1 to 10 carbon atoms substituted with 1 to 4 halogen atoms of atomic number 17 to 35 (chlorine or bromine), cycloalkyl of 3 to 10 carbon atoms or cycloalkyl of 3 to 10 carbon atoms substituted with 1 to 4 halogen atoms of atomic number 17 to 35; $R^4$ is hydrogen, alkyl of 1 to 10 carbon atoms, alkyl of 1 to 10 carbon atoms substituted with 1 to 4 halogen atoms of atomic number 17 to 35, cycloalkyl of 3 to 10 carbon atoms or cycloalkyl of 3 to 10 carbon atoms substituted with 1 to 4 halogen atoms of atomic number 17 to 35.

2. The method of claim 1 wherein R is phenyl or phenyl substituted with 1 to 4 halogen atoms of atomic number 9 to 35, trifluoromethyl, trichloromethyl, nitro groups, alkyl groups individually of 1 to 4 carbon atoms or alkoxy groups individually of 1 to 4 carbon atoms, with the proviso that when R is phenyl substituted with alkyl or alkoxy, the alkyl or alkoxy substituent will be in position 2, 4 or 6 of the benzene nucleus.

3. The method of claim 1 wherein R is phenyl or phenyl substituted with 1 to 4 halogen atoms of atomic number 9 to 35, trifluoromethyl or nitro groups, $R^1$ is hydrogen or alkyl of 1 to 2 carbon atoms, $R^2$ is hydrogen or alkyl of 1 to 2 carbon atoms, $R^3$ is alkyl of 1 to 6 carbon atoms substituted with 1 to 4 halogen atoms of atomic number 17 to 35, cycloalkyl of 3 to 6 carbon atoms or cycloalkyl of 3 to 6 carbon atoms substituted with 1 to 4 halogen atoms of atomic number 17 to 35, $R^4$ is hydrogen, alkyl of 1 to 6 carbon atoms substituted with 1 to 4 halogen atoms of atomic number 17 to 35, cycloalkyl of 3 to 6 carbon atoms or cycloalkyl of 3 to 6 carbon atoms substituted with 1 to 4 halogen atoms of atomic number 17 to 35.

4. The method of claim 1 wherein $R^1$ is hydrogen or methyl, $R^2$ is alkyl of 1 to 2 carbon atoms, $R^3$ is alkyl of 1 to 4 carbon atoms substituted with 0 to 2 halogen atoms of atomic number 17 to 35, $R^4$ is hydrogen or alkyl of 1 to 4 carbon atoms substituted with 0 to 2 halogen atoms of atomic number 17 to 35 or cycloalkyl of 3 to 6 carbon atoms substituted with 0 to 2 halogen atoms of atomic number 17 to 35.

5. The method of claim 1 wherein R is phenyl or phenyl substituted with 1 to 2 halogen atoms of atomic number 9 to 35, trifluoromethyl or nitro groups, $R^1$ is hydrogen or alkyl of 1 to 2 carbon atoms, $R^2$ is alkyl of 1 to 2 carbon atoms, $R^3$ is alkyl of 1 to 4 carbon atoms, $R^4$ is hydrogen or alkyl of 1 to 4 carbon atoms or cyclohexyl.

6. The method of claim 1 wherein R is phenyl substituted with 1 to 2 halogens of atomic number 9 to 35, $R^1$ is hydrogen, $R^2$ is methyl, $R^3$ is methyl, and $R^4$ is hydrogen, alkyl of 1 to 4 carbon atoms or cyclohexyl.

7. The method of claim 6 wherein the urea is 1-methyl-1-(N-methylbutyramidothio)-3-(2-fluorophenyl) urea.

8. The method of claim 6 wherein R is 2-fluorophenyl and $R^4$ is cyclohexyl.

9. The method of claim 6 wherein the urea is 1-methyl-1-(N-methylacetamidothio)-3-(2-fluorophenyl) urea.

10. The method of claim 6 wherein the urea is 1-methyl-1-(N-methylformamidothio)-3-(3,4-dichlorophenyl) urea.

11. The method of claim 6 wherein the urea is 1-methyl-1-(N-methylformamidothio)-3-(2-fluorophenyl) urea.

12. An herbicidal composition comprising an inert carrier and an herbicidally effective amount of the urea defined in Claim 1.

13. The composition of claim 12 wherein R is phenyl or phenyl substituted with 1 to 4 halogen atoms of atomic number 9 to 35, trifluoromethyl, trichloromethyl, nitro groups, alkyl groups individually of 1 to 4 carbon atoms or alkoxy groups individually of 1 to 4 carbon atoms, with the proviso that when R is phenyl substituted with alkyl or alkoxy, the alkyl or alkoxy substituent will be in position 2, 4 or 6 of the benzene nucleus.

14. The composition of claim 12 wherein R is phenyl or phenyl substituted with 1 to 4 halogen atoms of atomic number 9 to 35, trifluoromethyl or nitro groups, $R^1$ is hydrogen or alkyl of 1 to 2 carbon atoms, $R^2$ is hydrogen or alkyl of 1 to 2 carbon atoms, $R^3$ is alkyl of 1 to 6 carbon atoms substituted with 1 to 4 halogen atoms of atomic number 17 to 35, cycloalkyl of 3 to 6 carbon atoms or cycloalkyl of 3 to 6 carbon atoms substituted with 1 to 4 halogen atoms of atomic number 17 to 35, $R^4$ is hydrogen, alkyl of 1 to 6 carbon atoms substituted with 1 to 4 halogen atoms of atomic number 17 to 35, cycloalkyl of 3 to 6 carbon atoms or cycloalkyl of 3 to 6 carbon atoms substituted with 1 to 4 halogen atoms of atomic number 17 to 35.

15. The composition of claim 12 wherein $R^1$ is hydrogen or methyl, $R^2$ is alkyl of 1 to 2 carbon atoms, $R^3$ is alkyl of 1 to 4 carbon atoms substituted with 0 to 2 halogen atoms of atomic number 17 to 35, $R^4$ is hydrogen or alkyl of 1 to 4 carbon atoms substituted with 0 to 2 halogen atoms of atomic number 17 to 35 or cycloalkyl of 3 to 6 carbon atoms substituted with 0 to 2 halogen atoms of atomic number 17 to 35.

16. The composition of claim 12 wherein R is phenyl or phenyl substituted with 1 to 2 halogen atoms of atomic number 9 to 35, trifluoromethyl or nitro groups, $R^1$ is hydrogen or alkyl of 1 to 2 carbon atoms, $R^2$ is alkyl of 1 to 2 carbon atoms, $R^3$ is alkyl of 1 to 4 carbon atoms, $R^4$ is hydrogen or alkyl of 1 to 4 carbon atoms or cyclohexyl.

17. The composition of claim 12 wherein R is phenyl substituted with 1 to 2 halogens of atomic number 9 to 35, $R^1$ is hydrogen, $R^2$ is methyl, $R^3$ is methyl, and $R^4$ is hydrogen, alkyl of 1 to 4 carbon atoms or cyclohexyl.

18. The composition of claim 12 wherein the urea is 1-methyl-1-(N-methylbutyramidothio)-3-(2-fluorophenyl) urea.

* * * * *

UNITED STATES PATENT AND TRADEMARK OFFICE
CERTIFICATE OF CORRECTION

PATENT NO. : 3,891,424
DATED : June 24, 1975
INVENTOR(S) : MELANCTHON S. BROWN ET AL It is certified that error appears in the above-identified patent and that said Letters Patent are hereby corrected as shown below:

Title page, "[75] Inventors: Melancthon S. Brown, deceased, late of Berkeley, Calif.; by Gustave K. Kohn, special administrator, Berkeley, Calif." should read:

--[75] Inventors: Melancthon S. Brown, deceased, late of Berkeley, Calif.; by Gustave K. Kohn, special administrator, Berkeley, Calif.; and Gustave K. Kohn, Berkeley, Calif.--

Signed and Sealed this twenty-fifth Day of May 1976

[SEAL]

Attest:

RUTH C. MASON
Attesting Officer

C. MARSHALL DANN
Commissioner of Patents and Trademarks